United States Patent
Kujawa et al.

(10) Patent No.: US 9,623,836 B2
(45) Date of Patent: Apr. 18, 2017

(54) PRETENSIONER WITH GUIDE LOOP OR ANCHOR

(71) Applicant: GM Global Technology Operations LLC, Detroit, MI (US)

(72) Inventors: Peter P. Kujawa, Howell, MI (US); George J. Strnad, Rochester, MI (US); Matt R. Gohlke, Clarkston, MI (US); Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 67 days.

(21) Appl. No.: 14/529,601

(22) Filed: Oct. 31, 2014

(65) Prior Publication Data

US 2016/0121846 A1    May 5, 2016

(51) Int. Cl.
| | |
|---|---|
| *B60R 22/195* | (2006.01) |
| *B60R 22/20* | (2006.01) |
| *B60R 22/24* | (2006.01) |
| *B60R 22/18* | (2006.01) |

(52) U.S. Cl.
CPC ........ *B60R 22/195* (2013.01); *B60R 22/1952* (2013.01); *B60R 22/201* (2013.01); *B60R 22/24* (2013.01); *B60R 2022/1818* (2013.01)

(58) Field of Classification Search
CPC ... B60R 22/46; B60R 22/195; B60R 22/4604; B60R 22/1951
See application file for complete search history.

(56) References Cited

U.S. PATENT DOCUMENTS

| | | | | |
|---|---|---|---|---|
| 5,211,694 A | * | 5/1993 | Sakakida | B60R 21/16 188/374 |
| 5,478,115 A | * | 12/1995 | Matsuki | B60R 22/4652 280/734 |
| 5,566,978 A | * | 10/1996 | Fleming | B60R 22/1951 188/377 |
| 5,794,977 A | * | 8/1998 | Frank | B60R 22/203 280/801.2 |
| 5,924,731 A | * | 7/1999 | Sayles | B60R 22/203 280/801.2 |

(Continued)

FOREIGN PATENT DOCUMENTS

| | | | | |
|---|---|---|---|---|
| DE | WO 9519899 A1 | * | 7/1995 | ............. B60R 21/02 |
| JP | 10329645 A | * | 12/1998 | |
| JP | 2006199197 A | * | 8/2006 | |

OTHER PUBLICATIONS

Toyoda et al., Arrangement Structure of Lap Outer Pretensioner, Aug. 3, 2006, JPO, JP 2006-199197 A, English Abstract.*

(Continued)

*Primary Examiner* — James English
(74) *Attorney, Agent, or Firm* — BrooksGroup (57) ABSTRACT

A number of variations may include a product comprising: a pretensioner that moves from a first position to a second position, several with a with guide loop assembly comprising: a guide loop; a pretensioner, wherein the pretensioner is attached to the guide loop; and wherein the pretensioner moves a guide loop from a first position to a second position upon deployment. A number of variations may also include a slot in the pretensioner body through which motion is communicated to a seatbelt anchor or guide loop to move it from a first position to a second position.

17 Claims, 10 Drawing Sheets

(56) References Cited

U.S. PATENT DOCUMENTS

| | | | | |
|---|---|---|---|---|
| 5,931,502 | A * | 8/1999 | Frank | B60R 22/203 |
| | | | | 280/801.2 |
| 6,186,548 | B1 * | 2/2001 | McFalls | B60R 22/203 |
| | | | | 280/801.2 |
| 6,626,463 | B1 * | 9/2003 | Arima | B60R 21/013 |
| | | | | 280/735 |
| 2003/0094805 | A1 * | 5/2003 | Mori | B60R 22/36 |
| | | | | 280/806 |
| 2009/0008919 | A1 * | 1/2009 | Mather | B60R 22/1951 |
| | | | | 280/807 |
| 2012/0146385 | A1 * | 6/2012 | Russell | B60R 22/022 |
| | | | | 297/480 |

OTHER PUBLICATIONS

Toyoda et al., Arrangement Structure of Lap Outer Pretensioner, Aug. 3, 2006, JPO, JP 2006-199197 A, Machine Translation of Description.*

Ahn et al., Anchor pretensioner for vehicle, Mar. 5, 2014, KIPO, KP 10-2014-0025925, full document.*

* cited by examiner

PRETENSIONER WITH GUIDE LOOP OR ANCHOR

TECHNICAL FIELD

The field to which the disclosure generally relates to includes seatbelts.

BACKGROUND

A vehicle may include one or more seatbelts.

SUMMARY OF ILLUSTRATIVE VARIATIONS

One variation may include a product comprising: a pretensioner with guide loop assembly comprising: a guide loop; a pretensioner, wherein the pretensioner is attached to the guide loop; and wherein the pretensioner moves a guide loop from a first position to a second position upon deployment.

Another variation may include a pretensioner which comprises: a cylindrical tube, wherein the cylindrical tube includes one or more slots; a piston, wherein the piston is moveably attached inside of the cylindrical tube; a fastener which attaches to the piston through the slot in the cylindrical tube; an initiator or micro gas generator; a holder, wherein the cylindrical tube and the initiator or micro gas generator are attached to the holder; and wherein when the pretensioner is deployed the piston moves the fastener in the slot from the first position to the second position.

Another variation may include a method comprising: tightening a worn seatbelt during an impact event comprising: deploying a pretensioner during an impact event causing a guide loop to move from a first position to a second position; and tightening the worn seatbelt assembly when the guide loop moves from the first position to the second position.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
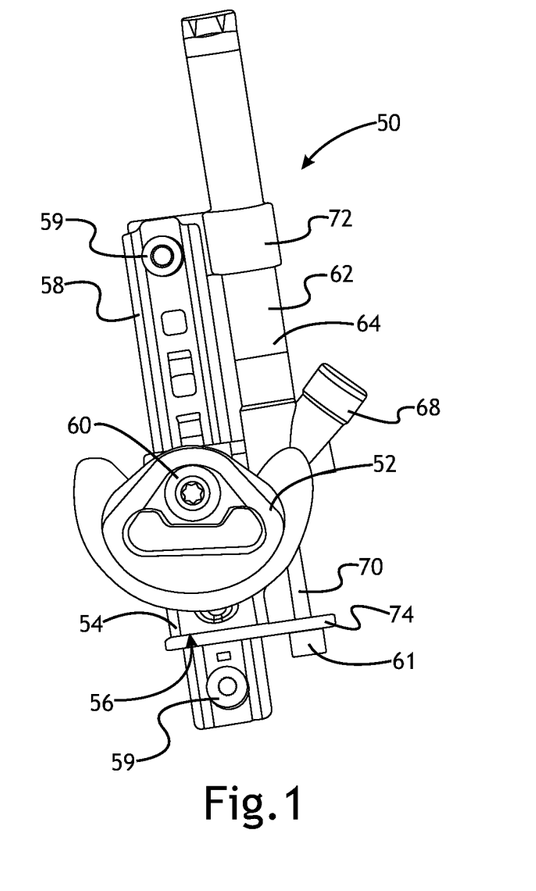
FIG. 1 illustrates a frontal view of a guide loop with a pretensioner according to a number of variations.
Figure 2:
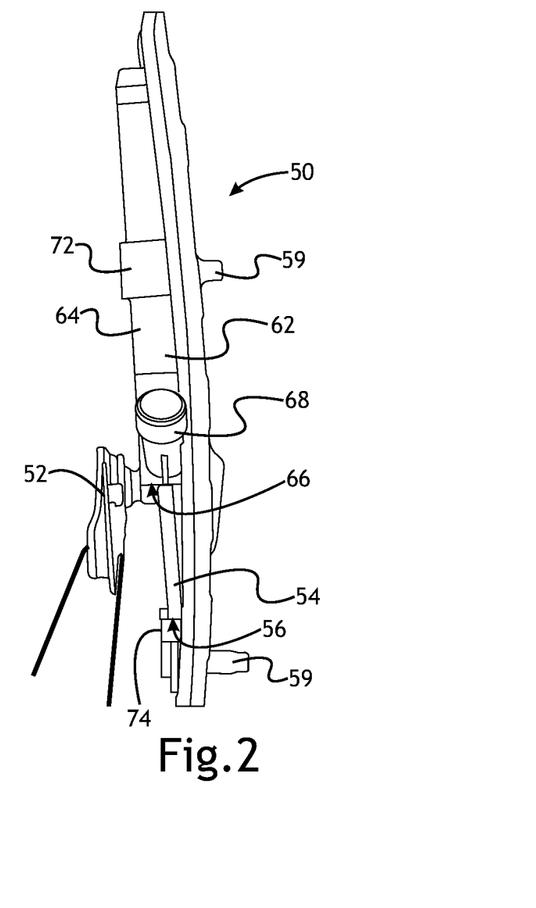
FIG. 2 illustrates a side view of a guide loop with a pretensioner according to a number of variations.

FIGS. 1-8 illustrate a number of variations. In one variation, a guide loop with pretensioner 50, 80 may comprise a guide loop 52 which may be attached to a guide loop slide 54 which may be movably attached to a guide loop rail 58. The guide loop 52 may be attached to the guide loop slide 54 in any number of variations including, but not limited to, one or more mechanical fasteners 60. In a number of variations, the guide loop rail 58 may be attached to a pretensioner 62, 82. A pretensioner 62, 82 may comprise a body 64, an ignition chamber 68, and a piston 70, variations of which are illustrated in FIGS. 1 and 2, or cable 84 which may be attached to an inner piston, variations of which are illustrated in FIGS. 5-8. The guide loop rail 58 may be attached to the pretensioner body 64 in any number of variations including, but not limited to one or more brackets 72. In a number of variations, the one or more brackets 72 and the guide loop rail 58 may be separate components, or may be formed as a single continuous component.

Referring to FIGS. 1-4, in a number of variations, the pretensioner 62 may be attached to the guide loop slide 54 so that a piston 70 may extend from a first end 66 of the pretensioner body 64 so that when the pretensioner 62 may be deployed, the piston 70 may move into the pretensioner body 64 which may cause the guide loop slide 54 and guide loop 52 to move upward from a first position 76 to a second position 78. In a number of variations, a slide plate 74 may attach the guide loop slide 54 to the piston 70. The slide plate 74 may extend along the bottom edge 56 of the guide loop slide 54 and may extend a distance past the piston 70 so that the piston 70 may extend through the guide loop slide 54. The piston 70 may then be secured to the slide plate 74 in any number of variations including, but not limited to, a mechanical fastener 61. In a number of variations, the slide plate 74 and the guide loop slide 54 may be separate components, or may be formed as a single continuous component. In a number of variations, the guide loop and pretensioner 50 may be attached to the vehicle body 216 in any number of variations including, but not limited to, attaching the guide loop rail 58 and/or the pretensioner 62 to the vehicle body 216 using one or more mechanical fasteners 59.

Figure 5:
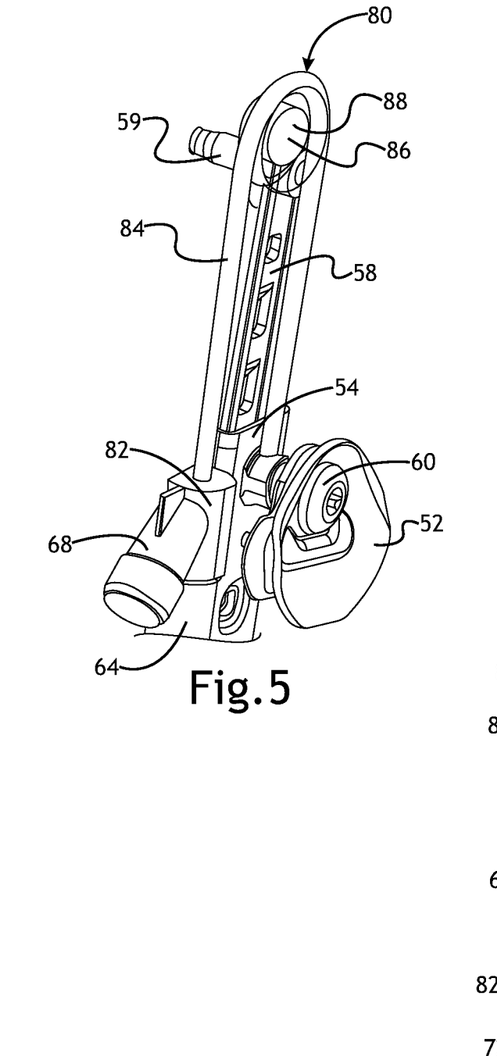
FIG. 5 illustrates a perspective view of a guide loop with a pretensioner according to a number of variations.
Figure 6:
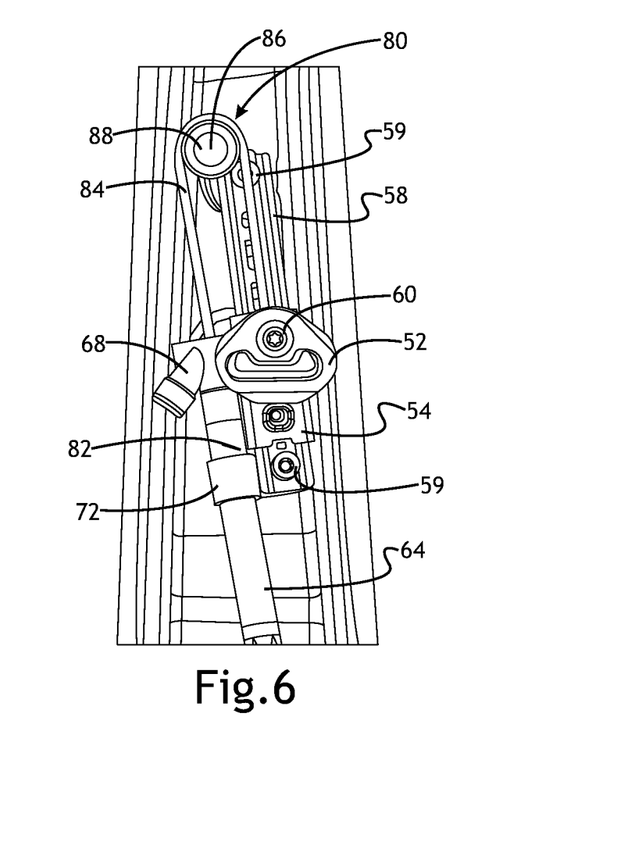
FIG. 6 illustrates a frontal view of a guide loop with a pretensioner according to a number of variations.
Figure 7:
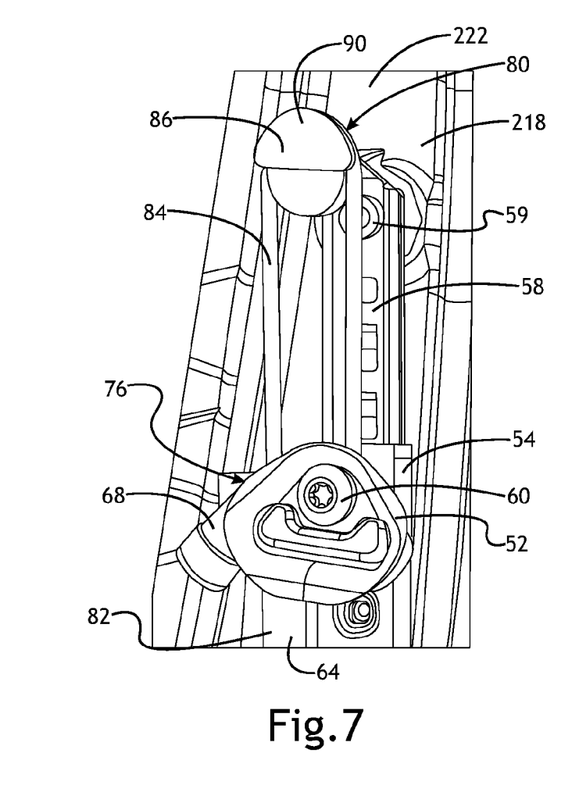
FIG. 7 illustrates a perspective view of a guide loop with a pretensioner according to a number of variations.
Figure 8:
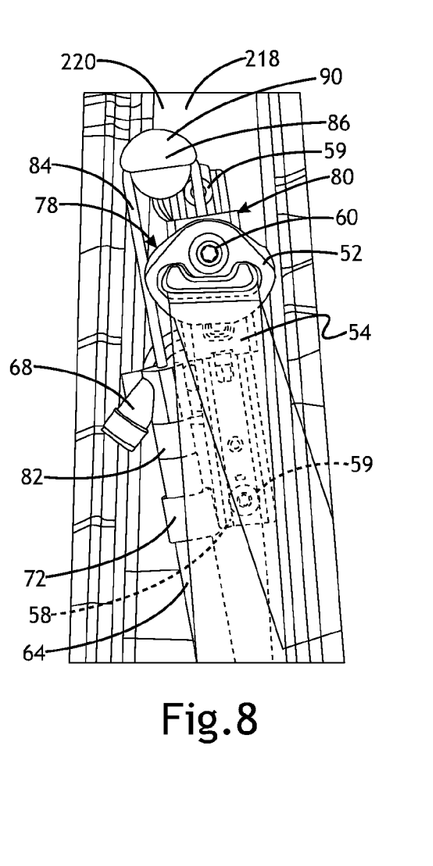
FIG. 8 illustrates a frontal view of a guide loop with a pretensioner according to a number of variations.

Referring to FIGS. 5-8, in a number of variations, a cable 84 may be operatively connected to an inner piston (not illustrated) inside of the pretensioner body 64 and also attached to guide loop 52. The cable 84 may extend from inside of the pretensioner body 64 and may loop around a guide 86. The cable 84 may be attached to the guide loop 52 in a number of variations including, but not limited to, a mechanical attachment. The cable 84 may be constructed and arranged so that when the pretensioner 82 may be deployed, a portion of the cable may be pulled into the pretensioner body 64 which may raise the guide loop 52 from a first position 76 to a second position 78, variations of which are illustrated in FIGS. 7 and 8. Any number of guides 86 may be used including, but not limited to, a grooved circular roller guide 88, variations of which are illustrated in FIGS. 5 and 6, or a top grooved fixed guide 90, variations of which are illustrated in FIGS. 7 and 8. In any number of variations, the guide loop and pretensioner 80 may be attached to the vehicle body 218 including, but not limited to, attaching the guide loop rail 58 and/or the pretensioner 82 to the vehicle body 218 using one or more mechanical fasteners 59.

Figure 9:
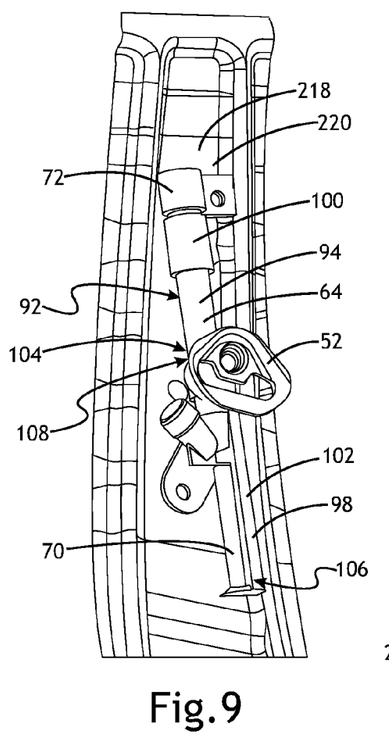
FIG. 9 illustrates a perspective view of a guide loop with a pretensioner according to a number of variations.

FIG. 9 illustrates a number of variations. In one variation, a guide loop with pretensioner 92 may comprise a guide loop 52, a pretensioner 94, a pretensioner slide 98, and a pretension slide stop 100. In any number of variations, the pretensioner slide 98 may be slideably attached to the pretensioner body 64. Any number of pretensioner slide 98 configurations may be used which may allow the pretensioner slide 98 to slide along the pretensioner body 64. In one variation, the pretensioner slide 98 may include one or more walls 102 which may extend from a first end 104 of the pretensioner slide 98 downward toward a second end 106 of the pretensioner slide 98, but which may end at a distance below the second end 106. In a number of variations, the guide loop 52 may be attached to the upper portion 108 of the pretensioner slide 98. In a number of variations, the pretensioner 94 may include a piston 70 which may extend from a first end 66 of the pretensioner body 64 and may attach to the pretensioner slide 98 so that when the pretensioner 94 may be deployed, the piston 70 may be pulled inside of the pretensioner body 64 which may cause the pretensioner slide 98 and guide loop 52 to raise from a first position 76 to a second position 78. In a number of variations, a pretensioner slide stop 100 may be attached to the pretensioner body 64 so that when the pretension 94 may be deployed, the pretensioner slide 98 may not extend upward past the pretensioner slide stop 100.

FIGS. 14-20 illustrate a number of variations. In one variation, a guide loop with pretensioner 110, 164, 192 may be constructed and arranged so that the pretensioner 112, 166, 194 may be integrated to include a moveable portion which may extend the length of the pretensioner 110, 164, 192. The pretensioner 112, 166, 192 may be constructed and arranged to directly attach to the guide loop 142, 144. In one variation, the guide loop 142, 144 may be attached to a slide rail 58 (not illustrated).

Figure 14:
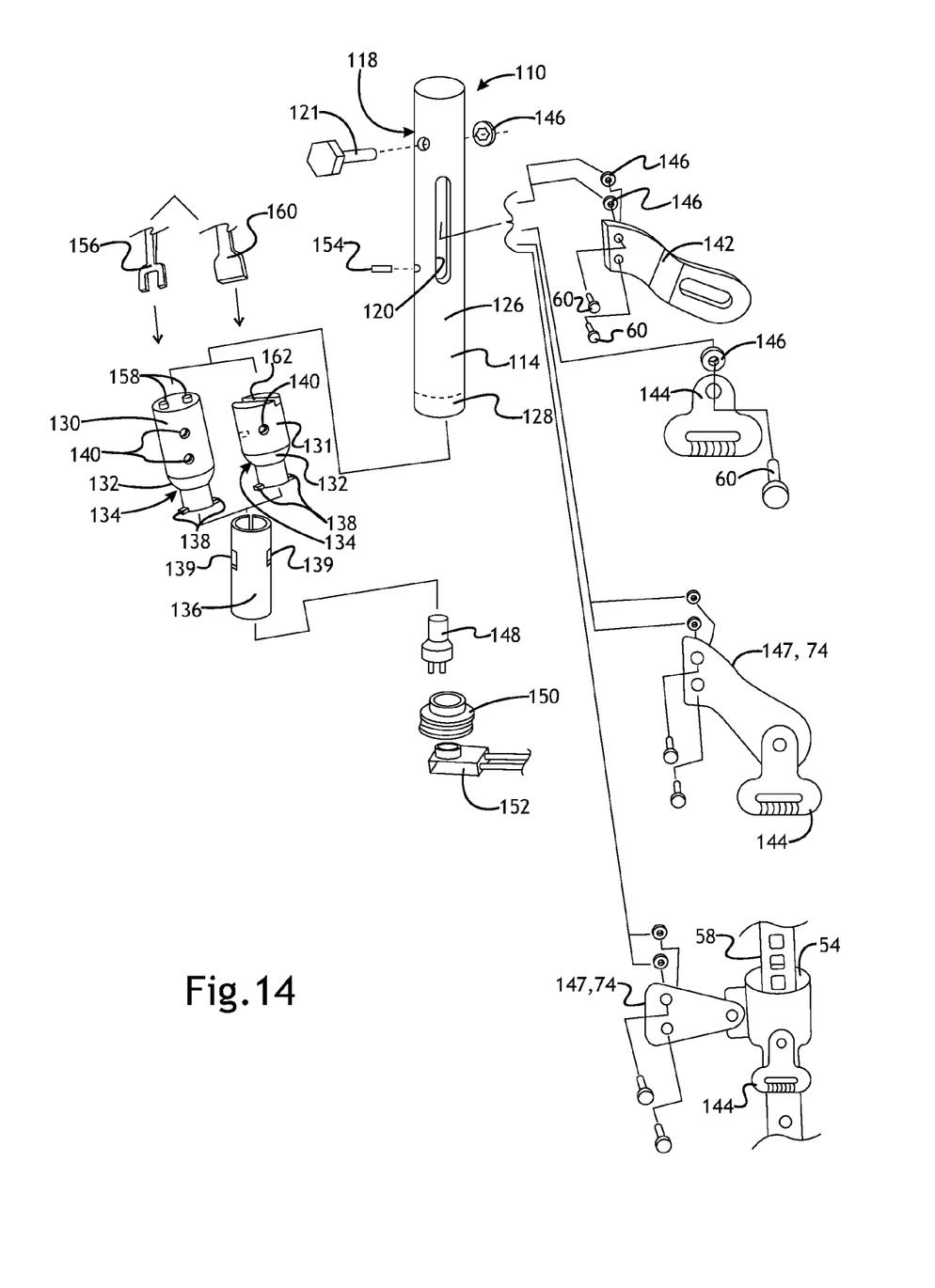
FIG. 14 illustrates an exploded view of a guide loop and pretensioner according to a number of variations.

In one variation, the guide loop with pretensioner 110 may include a pretensioner 112 which may comprise a cylindrical tube 114 which may include one or more slots 120 along its body 126. In one variation, the cylindrical tube 114 may include a slot 120 which may be constructed and arranged so that it may function as an opening for one or more mechanical fasteners 60 which may be used to attach the guide loop 142, 144 to the pretensioner 112, a variation of which is illustrated in FIG. 14. In a number of variations, a piston 130, 131 may be inserted into the bottom 128 of the cylindrical tube 114. The piston 130, 131 may include a wedge reaction surface 132 which may be located on the bottom portion 134 of the piston 130, 131 and may sit on the wedge and collar 136. The piston 130, 131 may also include one or more wedge attachment features 138 which may lock the piston 130, 131 to the wedge and collar 136 which may include one or more locking openings 139. The piston 130, 131 may also be constructed and arranged to include one or more threaded holes 140 which may be used for one or more mechanical fasteners 60. In one variation, the piston 130 may include two threaded holes 140. A stationary guide loop 142 may be attached to the piston 130 using two mechanical fasteners 60 which may prevent the guide loop 142 from pivoting. In another variation, the guide loop attachment 131 may include a single threaded hole 140. A single mechanical fastener 60 may be used to attach a pivoting or rotating guide loop 144 to the piston 131 which may allow for rotating or pivoting of the guide loop 144. In a number of variations, one or more washers 146 may be used with the mechanical fasteners 60.

Figure 15:
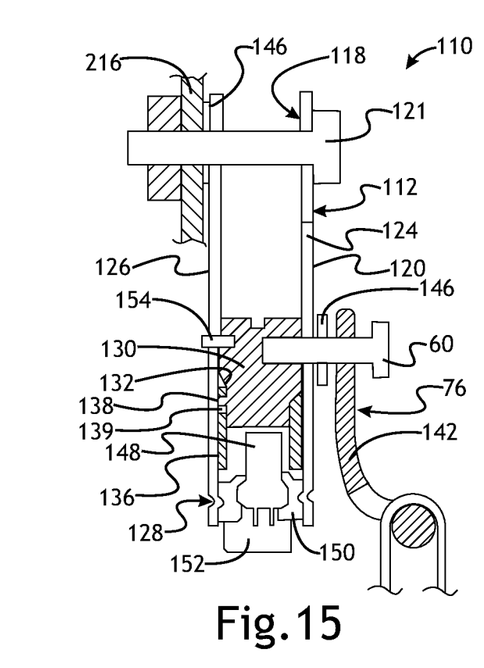
FIG. 15 illustrates a sectional view of a guide loop and pretensioner according to a number of variations.
Figure 16:
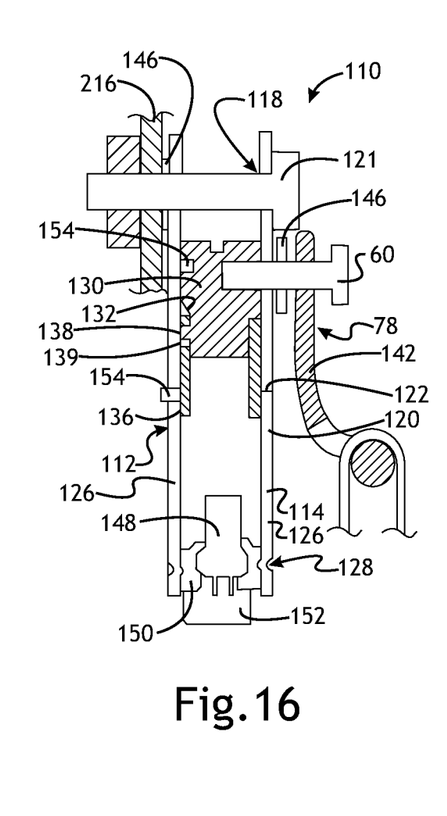
FIG. 16 illustrates a sectional view of a guide loop and pretensioner according to a number of variations.
Figure 17:
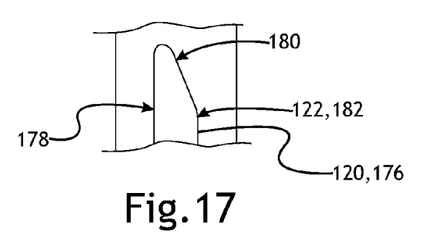
FIG. 17 illustrates an anti-reversal feature according to a number of variations.

In a number of variations, the wedge and collar 136 may be attached to the piston 130, 131 and may be placed over an initiator or micro gas generator (MGG) 148. The wedge and collar 136 may be constructed and arranged so that if the pretensioner 112 is deployed, the wedge and collar 136 may cover at least the bottom portion 122 of the slot 120 to prevent gas from leaking through the slot 120, a variation of which is illustrated in FIG. 16. The top portion 124 of the slot 120 may act as a travel stop which may prevent the guide loop 142, 144 from moving out of the pretensioner 112 via a mechanical fastener 60, a variation of which is illustrated in FIG. 16. In a number of variations, the top portion 124 of the slot 120 may include an anti-reverse feature 178 which may include a wedge feature 180, a variation of which is illustrated in FIG. 17. The initiator or MGG 148 may be attached to a holder 150 such as by crimping. An electrical connector 152 may attach to the initiator or MGG 148. A bottom portion 128 of the cylindrical tube 114 and initiator or MGG 148 may then be crimped to the holder 150, variations of which are illustrated in FIGS. 15 and 16. The cylindrical tube 114 may be attached to a vehicle body 216 in any number of variations including, but not limited to, a mechanical fastener 121 which may extend through an upper portion 118 of the cylindrical body 126. In a number of variations, during an impact event, a signal may be sent to the ignition chamber or MMG 148 in the pretensioner 112 which may cause the pretensioner 112 to deploy which may cause the piston 130, 131 to move upward which may cause the guide loop 142, 144 to move from a first position 76 to a second position 78, variations of which are illustrated in FIGS. 15 and 16. In a number of variations, in a first position 76 the mechanical fastener 60 which may be attached to the guide loop 142, 144 and piston 130, 131 may be seated in a full down position so that the mechanical fastener 60 may be flush with the bottom 122 of the slot 120 and in a second position 78 the mechanical fastener 60 may be in a full upward position so that the mechanical fastener 60 may be flush with the top 124 of the slot 120. In a number of variations, the mechanical fastener 60 may be attached to an intermediate component 147 or slide plate 74 which may be attached to a guide loop or a portion of a guide loop slide 54 which rides on a guide loop rail 58.

In a number of variations, the pretensioner 112 may also include a pin 154 or similar mechanical device such as a threaded fastener which may extend through at least a portion of the cylindrical body 126 and at least a portion of the piston 130, 131 or a piston assembly made up of multiple parts. The pin 154 may be used to hold the piston 130, 131 in place prior to deployment of the pretensioner 112. If the pretensioner 112 is deployed, the pin 154 may shear so that the piston 130, 131 may move upward. In a number of variations, the pin 154 may be positioned so that it may be adjacent a vehicle structure 216 so that the pin 154 cannot back out and may be contained if it attempts to disengage from the pretensioner 112 upon deployment.

In a number of variations, assembly orientation assist tooling 156, 160 may be used to orientate the piston 130, 131 in the cylindrical body 126 when the guide loop 142, 144 is attached to the piston 130, 131. In one variation, a two-prong piston guide 156 may mate with two indentations 158 in the piston 130 which may be used for assembly of the stationary guide loop 142. In another variation, a single edge piston guide 160 may mate with a single indentation 162 in the piston 131 which may be used for assembly of the pivoting guide loop 144. It should be noted that any number of variations and configurations of the piston guides 156, 160, pistons 130, 131 and guide loops 142, 144 may be used in the assembly of the pretensioner 112.

Figure 18:
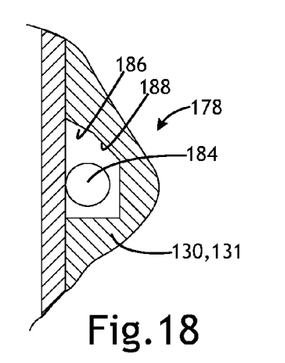
FIG. 18 illustrates an anti-reversal feature according to a number of variations.
Figures 19, 20:
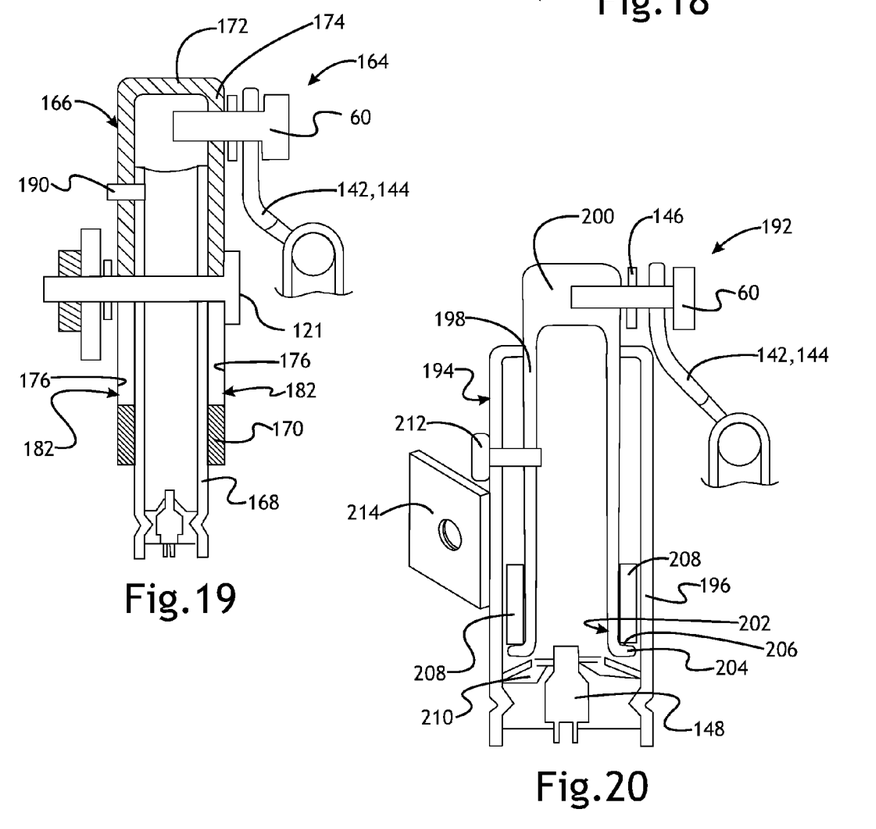
FIG. 19 illustrates a sectional view of a guide loop and pretensioner according to a number of variations.
FIG. 20 illustrates a sectional view of a guide loop and pretensioner according to a number of variations.

In another variation, a guide loop with pretensioner 164 may comprise a pretensioner 166 which may include a pretensioner body 168 and a pretensioner slide tube 170, a variation of which is illustrated in FIG. 19. The pretensioner slide tube 170 may be slideably mounted over the pretensioner body 168. The pretensioner slide tube 170 may include a top cover 172 which may prevent gases from escaping from the pretensioner 166 upon deployment as well as allowing the gas to push the pretensioner slide tube 170 upward. The pretensioner slide tube 170 may also include two opposing slots 176 which may allow the pretensioner slide tube 170 to move upward upon deployment of the pretensioner 166. In a number of variations, one or more of the slots 176 may include an anti-reverse feature 178, variations of which are illustrated in FIG. 17 and also in FIG. 18. The anti-reverse feature 178 may include, but is not limited to, a wedge-shape feature 180 at the bottom 182 of the slot 176 which may prevent reverse travel of the pretensioner slide tube 170 after deployment of the pretensioner 166, a variation of which is illustrated in FIG. 17, or a ball and wedge reverse travel prevention approach which causes a series of balls 184 to wedge into the upper angled surface 186 of the circumferential slot 188 in the piston 130, 131 in which they reside when any reverse travel motion occurs, a variation of which is illustrated in FIG. 18. In a number of variations, the guide loop 142, 144 may be attached to the upper portion 174 of the pretensioner slide tube 170 in any number of variations including, but not limited to, one or more mechanical fasteners 60. In a number of variations, a pin 190 may extend through at least a portion of the pretensioner slide tube 170 and the pretensioner body 168 which may assist in holding the pretensioner slide tube 170 in place pre-deployment. In a number of variations, the pin 190 may be constructed and arranged to shear if the pretensioner 166 is deployed. The pin 190 may be positioned so that it may be adjacent a vehicle structure 216 so that the pin cannot back out and so that if the pin 190 attempts to disengage from the pretensioner 166 upon deployment, the pin 190 may be contained. The pretensioner 166 may be attached to a vehicle structure 216 in any number of variations including, but not limited to, one or more mechanical fasteners 121 which may extend through the pretensioner slide tube 170 and the pretensioner body 168.

In another variation, a guide loop with pretensioner 192 may comprise a pretensioner 192 which may include a pretensioner body 196 and an inner cylindrical tube 198, a variation of which is illustrated in FIG. 20. The inner cylindrical tube 198 may be positioned inside of the pretensioner body 196 and may be constructed and arranged to move upward inside of the pretensioner body 196 during deployment of the pretensioner 192. The inner cylindrical tube 198 may include a top portion 200 which may be constructed and arranged, such as but not limited to, by being curled inward, to prevent gases from escaping from the pretensioner 194 upon deployment as well as allowing the gas to push the inner cylindrical tube 198 to move upward. A lower portion 202 of the inner cylindrical tube 198 may include a lip 204 which may extend outward from the inner cylindrical tube 198. The inner cylindrical tube 198 may also include one or more spacers 208 which may be attached to the upper surface 206 of the lip 204 and may be constructed and arranged to limit the maximum travel of the inner cylindrical tube 198. The spacer 208 may also function as a gasket to prevent or limit gas from escaping out between the cylindrical tube 198 and the pretensioner body 196. A cone shaped washer 210 may be located within the pretensioner body 196 which may prevent reverse travel and may enable gas sealing. In a number of variations, a pin 212 or similar feature such as a threaded fastener may extend through at least a portion of the pretensioner body 196 and the inner cylindrical tube 198 which may assist in holding the pretensioner inner cylindrical tube 198 in place pre-deployment. In a number of variations, the pin 212 may be constructed and arranged to shear if the pretensioner 194 is deployed. The pin 212 may be positioned so that it may be adjacent a vehicle structure 216 so it will not back out and which may contain the pin 212 if it attempts to disengage from the pretensioner 194 upon deployment. A guide loop 142, 144 may be attached to the upper portion 200 of the inner cylindrical tube 198 in any number of variations including, but not limited to, one or more mechanical fasteners 60. In a number of variations including by welding, a mounting bracket 214 may be attached to the pretensioner body 196 and may be used to attach the pretensioner 194 to a vehicle structure 216 including by a fastener.

Figure 10:
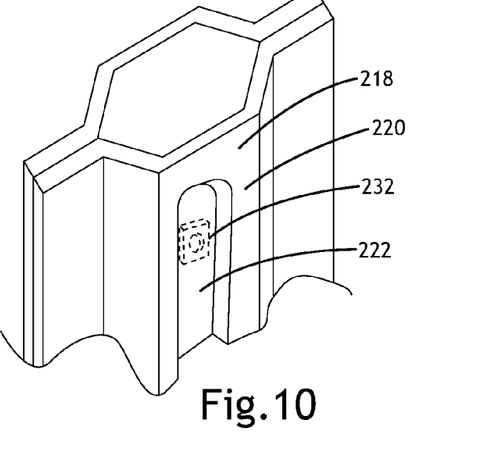
FIG. 10 illustrates a perspective sectional view of a vehicle body according to a number of variations.

In a number of variations, the guide loop with pretensioner 50, 80, 94, 110, 164, 192 may be attached to a vehicle body 216 in any number of locations which include a seatbelt 234 including, but not limited to, a vehicle body pillar 218. In a number of variations, the guide loop with pretensioner 50, 80, 94, 110, 164, 192 may be attached to an inboard surface 220 of the vehicle body pillar 218. In one variation, the inboard surface 220 of a vehicle body pillar 218 may be constructed and arranged to include a recess 222 which may act as a holding feature, a variation of which is illustrated in FIG. 10.

Figure 11:
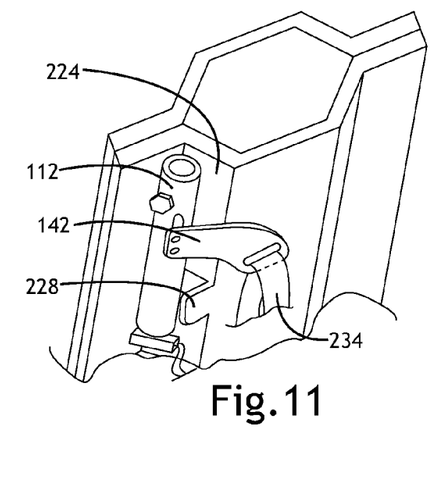
FIG. 11 illustrates a perspective view of a guide loop with pretensioner according to a number of variations.
Figure 12:
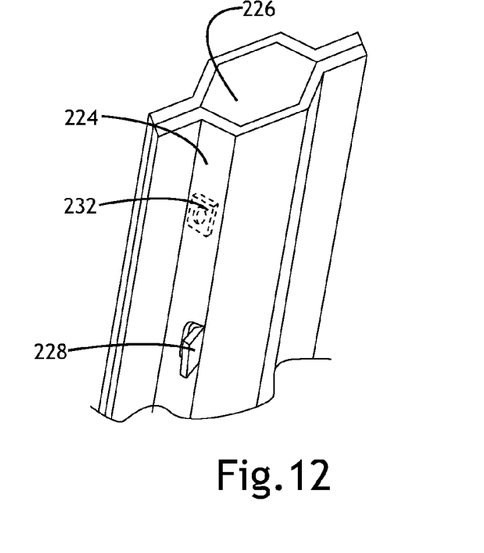
FIG. 12 illustrates a perspective section view of a vehicle body according to a number of variations.
Figure 13:
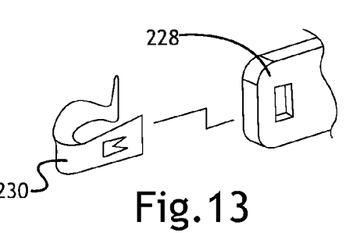
FIG. 13 illustrates a close-up of a vehicle body tab and clip according to a number of variations.

In another variation, a guide loop with pretensioner 112, 164, 192 may be attached to a rearward side surface 224 of a vehicle body pillar 218, a variation of which is illustrated in FIG. 11 or a forward side surface of a vehicle body pillar (not illustrated). In a number of variations, the vehicle body pillar 218 may include a tab 228 which may act as a holding feature. The tab 228 may be a flipped cut-out from the vehicle body pillar 218, variations of which are illustrated in FIGS. 11 and 12, or may be a separate added piece. In another variation, the tab 228 may include an anti-rattle spring clip 230, a variation of which is illustrated in FIG. 13. The pretensioner 112, 166, 194 may be attached to the vehicle body pillar 218 in a number of variations including, but not limited to a mechanical fastener 121 such as a bolt, and an anchored nut 232 which may be attached to the bolt from an inside surface 226 of the vehicle body pillar 218.

Figure 21:
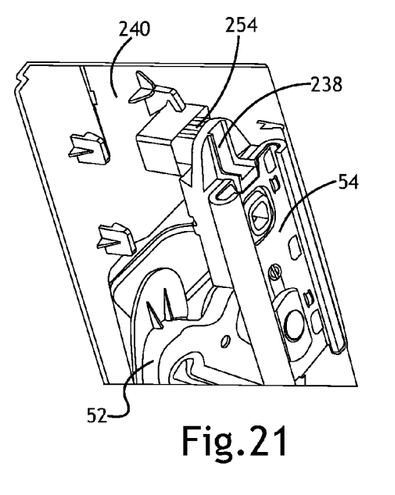
FIG. 21 illustrates a rear perspective view of a guide loop with pretensioner attached to vehicle trim according to a number of variations.
Figure 22:
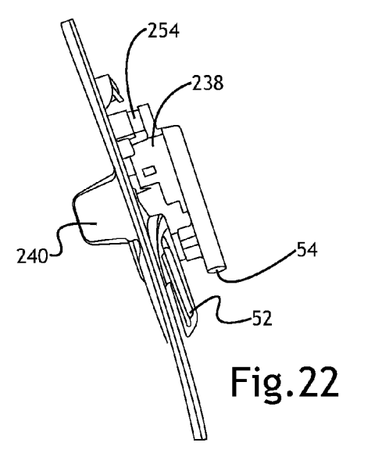
FIG. 22 illustrates a side view of a guide loop with pretensioner attached to vehicle trim according to a number of variations.
Figure 23:
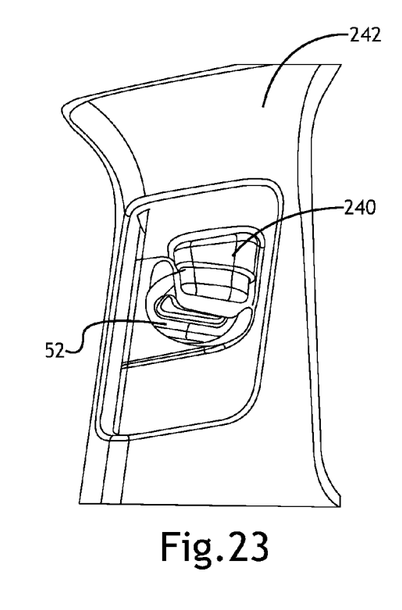
FIG. 23 illustrates a front view of a guide loop with pretensioner in vehicle trim according to a number of variations.

FIGS. 21-24 illustrate a number of variations. In one variation, a trim attachment component 238 may be attached to the guide loop slide 54, a variation of which is illustrated in FIG. 21-22, or a pretensioner 94, 112, 166, 194 (not illustrated) in any number of variations including, but not limited to, a mechanical fastener, and may then be attached to an adjustable trim piece 240 which may be slideably attached to any number of trim components 242 including, but not limited to, pillar trim, a variation of which is illustrated in FIGS. 21 and 22. The adjustable trim piece 240 may be attached to the trim attachment component 238 in any number of variations including, but not limited to, a snap fit 254 and/or a mechanical fastener, a variation of which is illustrated in FIG. 21. The adjustable trim piece 240 may be constructed and arranged so that in the case of an impact event, the pretensioner 62, 82, 94, 112, 166, 194 may be deployed which may cause the guide loop 52 to move upward. In a number of variations, if the guide loop 52 is of a variation in which the occupant 236 does not have the option to manually adjust the position of the guide loop 52, as discussed hereafter, a reduction in trim component parts may result.

Figure 3:
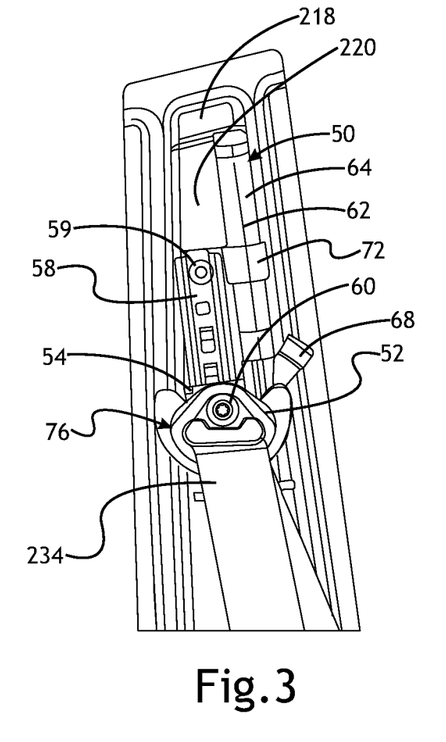
FIG. 3 illustrates a frontal view of a guide loop with a pretensioner according to a number of variations.
Figure 4:
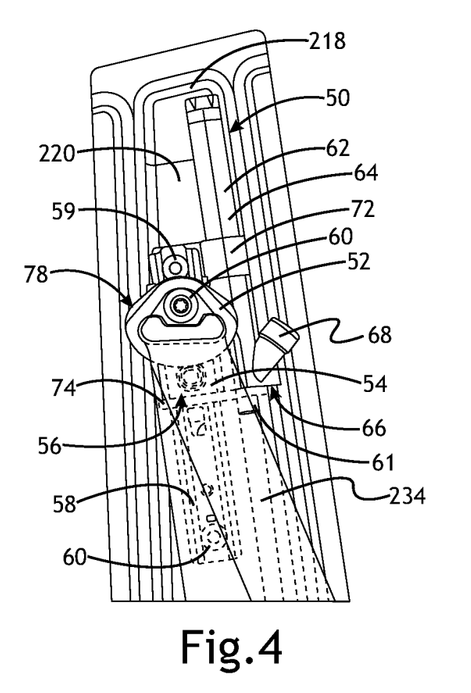
FIG. 4 illustrates a frontal view of a guide loop with a pretensioner according to a number of variations.
Figure 24:
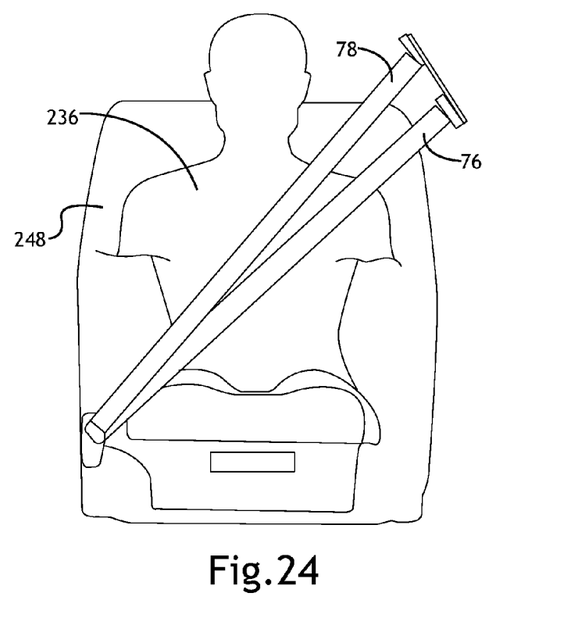
FIG. 24 illustrates a schematic of variations of seatbelt positions in relation to an occupant according to a number of variations.

In a number of variations, a seatbelt assembly 234 may be adjustably attached to the guide loop 52, 142, 144, a variation of which is illustrated in FIGS. 3 and 4. A worn seatbelt assembly 234 may provide an occupant 236 with protection during an impact event. In a number of variations, during an impact event, the position of the worn seatbelt 234 may provide an occupant 236 with ideal protection when the guide loop 52, 142, 144 is in a full upward position 78 so that the seatbelt 234 may lie across the occupant's clavicle. Occupants 236, however, may not find this position of the seatbelt 234 to be at an ideal comfort level. Occupants 236 may find a preferred comfort level of the worn seatbelt 234 when the guide loop 52, 142, 144 is in a downward position 76. The guide loop with pretensioner 50, 80, 92, 110, 164, 192 may allow the occupant 236 to wear the seatbelt 234 in a more comfortable position when the guide loop 52, 142, 144 is at a first position 76 during normal operation of the vehicle while providing maximum protection by raising the guide loop 52, 142, 144 to a second position 78 which is fully upward in an impact event, a variation of which is illustrated in FIG. 24.

In any of the variations above, the guide loop 52, 142, 144 may be of a variation in which an occupant 236 may manually adjust the position of the guide loop 52, 142, 144 to a full downward position, a full upward position, or any position in between. During an impact event, the guide loop with pretensioner 50, 80, 92, 110, 164, 192 may automatically raise the guide loop 52, 142, 144 from whatever position the guide loop 52, 142, 144 is in, to a full upward position.

In any of the variations above, the guide loop 52, 142, 144 may be of a variation in which an occupant 236 may not manually adjust the position of the guide loop 52, 142, 144. In this variation, the guide loop 52, 142, 144 may be set to first downward position so that the seatbelt 234 may sit comfortably on an occupant 236. During an impact event, the guide loop with pretensioner 50, 80, 92, 110, 164, 192 may automatically raise the guide loop 52, 142, 144 from the first downward position to a full upward position.

In any of the above variations, any number of guide loops 52, 142, 144 may be used including, but not limited to, pivoting or rotatable guide loops, and/or stationary guide loops. In a variation where the pretensioner 112, 166, 194 is attached to the rearward or forward side of a vehicle structure, the guide loop 142 may be formed to curve around the vehicle structure, a variation of which is illustrated in FIG. 14. In addition, a separate structural bridge piece (not illustrated) between the guide loop and pretensioner may be used, such as to cantilever the guide loop off of the pretensioner and still allow guide loop rotation about its attachment pivot.

Figure 25:
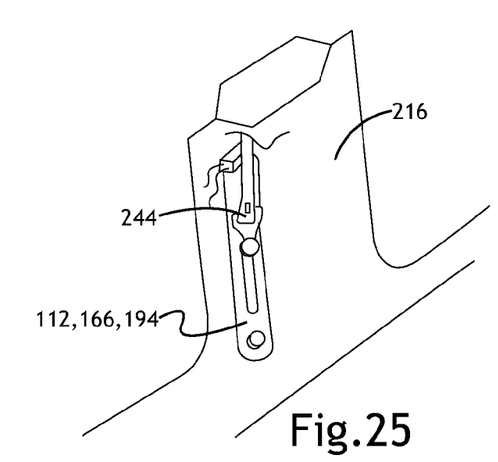
FIG. 25 illustrates a perspective view of a vehicle body mounted anchor with pretensioner according to a number of variations.
Figures 26, 27:
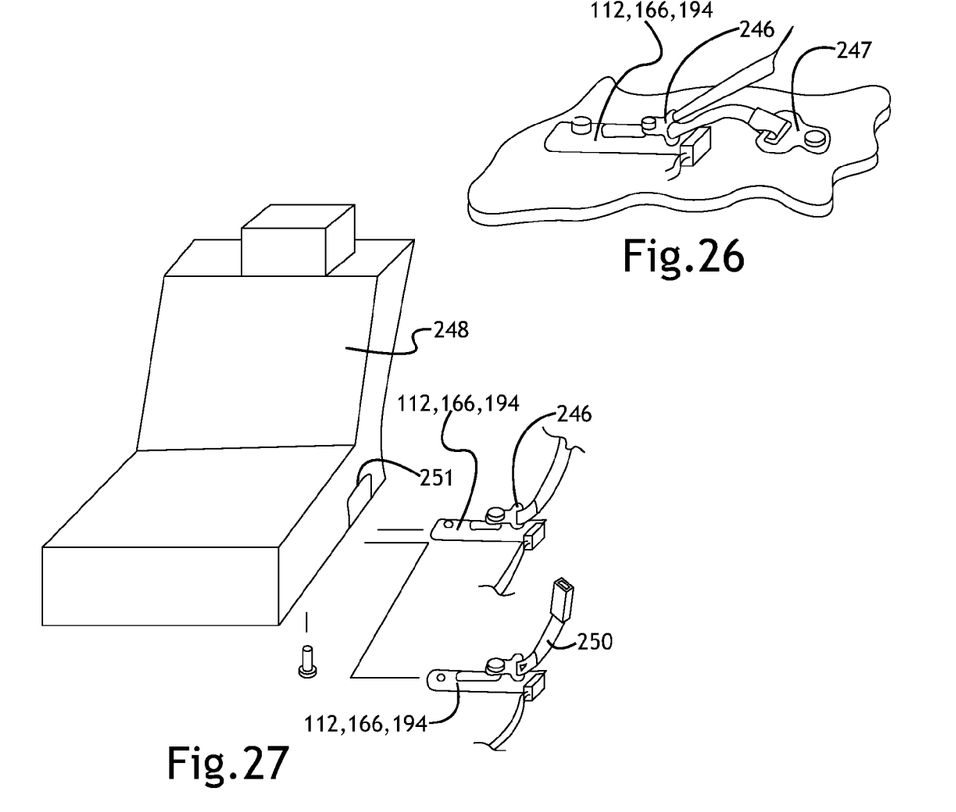
FIG. 26 illustrates a perspective view of a seat mounted anchor and pretensioner according to a number of variations.
FIG. 27 illustrates a perspective view of a seat and seat mounted anchor and a seat mounted buckle according to a number of variations.

FIGS. 25-27 illustrate a number of variations. In one variation, any of the integrated pretensioners with a moveable portion 112, 166, 194 described above may be attached to any number of seatbelt components to improve an occupant's 236 restraint during an impact event. In one variation, an integrated pretensioner with a moveable portion 112, 166, 194 may be attached to a vehicle body 216 mounted lower seatbelt anchor 244, a variation of which is illustrated in FIG. 25. The integrated pretensioner with a moveable portion 112, 166, 194 may then move the vehicle mounted anchor 244 downward from a first position to a second position upon deployment. In another variation, an integrated pretensioner with a moveable portion 112, 166, 194 may be attached to a seat structure 248, variations of which are illustrated in FIG. 27. The integrated pretensioner with a moveable portion 112, 166, 194 may move the lower portion of the seatbelt from a first position to a second position upon deployment. In a number of variations, the integrated pretensioner with a moveable portion 112, 166, 194 may be oriented laterally in the seat 248 so that when it is deployed, the lower portion of the seatbelt 234 does not shift fore-aft or up or down but the end moves laterally inward toward the occupant centerline pulling the belt inward which may pull the belt downward above seat reaction surface edge 251 around which the belt would route in the deployed state. In yet another variation, an integrated pretensioner with a moveable portion 112, 166, 194 may be attached to a seat mounted buckle 250, a variation of which is illustrated in FIG. 27. The integrated pretensioner with a moveable portion 112, 166, 194 may move the seat mounted buckle 250 laterally from a first position including, but not limited to, outward from the occupant centerline to a second position including, but not limited to, closer to the occupant centerline upon deployment which may pull the buckle downward above seat reaction surface edge 251 around which the buckle would route in the deployed state. In yet another variation, an integrated pretensioner with a moveable portion 112, 166, 194 may be mounted adjacent to a lower seatbelt anchor 247, a variation of which is illustrated in FIG. 26. The integrated pretensioner with a moveable portion 112, 166, 194 and guide loop 246 may move the guide loop 246 laterally from a first position closer to the lower seatbelt anchor 247 to a second position further away from a lower seatbelt anchor 247 upon deployment. The seat reaction surface edge 251 may be part of or attached to the seat structure, the seat trim, or the seatbelt assembly which may be attached to the seat.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention. For instance the pretensioner configuration with a fastener which is propelled in a slot could have the fastener configured and attached in a manner where it pushes an occupant adjustable guide loop or moveable structure attached to the guide loop from a lower position to the uppermost position. In addition other variations common to the industry may be utilized. The piston and tube approach is similar to a seatbelt pretensioner and elements of existing seatbelt pretensioner designs can be used.

Variation 1 may include a product comprising: a pretensioner with guide loop assembly comprising: a guide loop; a pretensioner, wherein the pretensioner is attached to the guide loop; and wherein the pretensioner moves a guide loop from a first position to a second position upon deployment.

Variation 2 may include a product as set forth in Variation 1 further comprising a seatbelt which is connected to the guide loop; wherein the seatbelt and the pretensioner with guide loop assembly are attached to a vehicle; and wherein when the seatbelt is worn by an occupant, the seatbelt tightens when the guide loop moves from the first position to the second position.

Variation 3 may include a product as set forth in any of Variations 1-2 wherein the pretensioner with guide loop assembly further includes at least one of a travel stop, a wedge anti-reversal travel feature, or a pre-deployment holding feature.

Variation 4 may include a product as set forth in any of Variations 1-3 further comprising a pillar trim attached to the guide loop with pretensioner.

Variation 5 may include a product as set forth in any of Variations 1-4 wherein the vehicle includes a vehicle structure which includes a recess, and wherein the pretensioner is attached in at least a portion of the recess.

Variation 6 may include a product as set forth in any of Variations 1-5 wherein the recess is located in at least one of an inboard surface, a rearward surface, or a frontal surface of a vehicle pillar.

Variation 7 may include a product as set forth in any of Variations 1-5 wherein the vehicle includes a holding feature which is constructed and arranged to hold the pretensioner in place in the vehicle.

Variation 8 may include a product as set forth in any of Variations 1-7 further comprising: a slide, wherein the guide loop is attached to the slide; a rail, wherein the slide is constructed and arranged to move along the rail; and wherein the pretensioner is attached to the slide.

Variation 9 may include a product as set forth in any of Variations 1-8 wherein the pretensioner further comprises a pretensioner body and a piston, and wherein the piston is attached to the slide, and wherein when the pretensioner is deployed, the piston is moved relative to the pretensioner body driving the slide and guide loop from the first position to the second position.

Variation 10 may include a product as set forth in any of Variations 1-8 wherein the pretensioner further comprises a pretensioner body, a piston located inside of the pretensioner body, and a cable operatively connected to the piston, a cable guide, wherein the cable is operatively connected to the cable guide, and wherein when the pretensioner is deployed, the cable is pulled into the pretensioner body which causes the slide and the guide loop to move from the first position to the second position.

Variation 11 may include a product as set forth in any of Variations 1-9 further comprising a pretensioner slide, wherein the pretensioner slide is slideably attached to the pretensioner and wherein the guide loop is attached to the pretensioner slide; wherein the pretensioner further comprises a pretensioner body and a piston, wherein the pretensioner slide is slideably attached to the pretensioner body and the piston is attached to the pretensioner slide, and wherein when the pretensioner is deployed the piston moves relative to the pretensioner body which causes the pretensioner slide and guide loop to move from the first position to the second position.

Variation 12 may include a product as set forth in any of Variations 1-8 wherein the pretensioner further comprises a pretensioner body and a pretensioner slide tube, wherein the pretensioner slide tube is slideably mounted over the pretensioner body, wherein the pretensioner slide tube includes at least two opposing slots, wherein the guide loop is attached to the pretensioner slide tube, and wherein when the pretensioner is deployed, the pretensioner slide tube moves the guide loop from the first position to the second position.

Variation 13 may include a product as set forth in any of Variations 1-8 wherein the pretensioner further comprises a pretensioner body and an inner cylindrical tube, wherein the inner cylindrical tube is slideably attached to the inside of the pretensioner body, wherein the guide loop is attached to the inner cylindrical tube, and wherein when the pretensioner is deployed, the inner cylindrical tube moves the guide loop from the first position to the second position.

Variation 14 may include a product as set forth in any of Variations 1-8 wherein the guide loop is at least one of a rotating style or a non-rotating style and is attached to the piston through a slot in the pretensioner housing.

Variation 15 may include a pretensioner which comprises: a cylindrical tube, wherein the cylindrical tube includes one or more slots; a piston, wherein the piston is moveably attached inside of the cylindrical tube; a fastener which attaches to the piston through the slot in the cylindrical tube; an initiator or micro gas generator; a holder, wherein the cylindrical tube and the initiator or micro gas generator are attached to the holder; and wherein when the pretensioner is deployed the piston moves the fastener in the slot from the first position to the second position.

Variation 16 may include a pretensioner as set forth in Variation 15 wherein the piston includes one or more assembly orientation features.

Variation 17 may include a pretensioner as set forth in any of Variations 15-16 with at least one of a travel stop which is partially formed with a fastener, one of a wedge anti-reverse travel feature, one of a slot sealing feature to prevent gas escape, and one of a pre-deployment holding feature.

Variation 18 may include a pretensioner as set forth in any of Variations 15-17 wherein the pretensioner is attached to at least one of a seatbelt anchor, a seatbelt buckle, or a guide loop, and wherein when the pretensioner is deployed, the pretensioner moves at least one of the seatbelt anchor, the seatbelt buckle, or the guide loop from a first position to a second position.

Variation 19 may include a pretensioner as set forth in any of Variations 15-18 wherein the pretensioner is oriented laterally in a seat so that when the integrated pretensioner is deployed, a position of an end of a seatbelt or a buckle does not significantly move in a fore aft or an up-down direction.

Variation 20 may include a method comprising: tightening a worn seatbelt during an impact event comprising: deploying a pretensioner during an impact event causing a guide loop to move from a first position to a second position; and tightening the worn seatbelt assembly when the guide loop moves from the first position to the second position.

The above description of select variations within the scope of the invention is merely illustrative in nature and, thus, variations or variants thereof are not to be regarded as a departure from the spirit and scope of the invention.

What is claimed is:

1. A product comprising:
   a shoulder belt guide loop;
   a pretensioner, wherein the pretensioner is attached to the shoulder belt guide loop; and
   wherein the pretensioner moves the shoulder belt guide loop from a first lower position to a second fully upward position upon deployment during an impact event.

2. The product of claim 1 further comprising a seatbelt which is connected to the shoulder belt guide loop; wherein the seatbelt, the pretensioner, and the shoulder belt guide loop are attached to a vehicle; and wherein when the seatbelt is worn by an occupant, the seatbelt tightens when the guide loop moves from the first lower position to the second fully upward position.

3. The product of claim 1 further comprising at least one of a travel stop, a wedge anti-reversal travel feature, or a pre-deployment holding feature.

4. The product of claim 2 further comprising a pillar trim attached to the shoulder belt guide loop.

5. The product of claim 2 wherein the vehicle includes a vehicle structure which includes a recess, and wherein the pretensioner is attached in at least a portion of the recess.

6. The product of claim 5 wherein the recess is located in at least one of an inboard surface, a rearward surface, or a frontal surface of a vehicle pillar.

7. The product of claim 2 wherein the vehicle includes a holding feature which is constructed and arranged to hold the pretensioner in place in the vehicle.

8. The product of claim 1 further comprising:
   a slide, wherein the shoulder belt guide loop is attached to the slide;
   a rail, wherein the slide is constructed and arranged to move along the rail; and
   wherein the pretensioner is attached to the slide.

9. The product of claim 8 wherein the pretensioner further comprises a pretensioner body and a piston, and wherein the piston is attached to the slide, and wherein when the pretensioner is deployed, the piston is moved relative to the pretensioner body driving the slide and the shoulder belt guide loop from the first lower position to the second fully upward position.

10. The product of claim 8 wherein the pretensioner further comprises a pretensioner body, a piston located inside of the pretensioner body, and a cable operatively connected to the piston, a cable guide, wherein the cable is operatively connected to the cable guide, and wherein when the pretensioner is deployed, the cable is pulled into the pretensioner body which causes the slide and the guide loop to move from the first lower position to the second fully upward position.

11. The product of claim 1 further comprising a pretensioner slide, wherein the pretensioner slide is slideably attached to the pretensioner and wherein the guide loop is attached to the pretensioner slide;
   wherein the pretensioner further comprises a pretensioner body and a piston, wherein the pretensioner slide is slideably attached to the pretensioner body and the piston is attached to the pretensioner slide, and wherein when the pretensioner is deployed the piston moves relative to the pretensioner body which causes the pretensioner slide and guide loop to move from the first lower position to the second fully upward position.

12. The product of claim 1 wherein the pretensioner further comprises a pretensioner body and a pretensioner slide tube, wherein the pretensioner slide tube is slideably mounted over the pretensioner body, wherein the pretensioner slide tube includes at least two opposing slots, wherein the guide loop is attached to the pretensioner slide tube, and wherein when the pretensioner is deployed, the pretensioner slide tube moves the guide loop from the first lower position to the second fully upward position.

13. The product of claim 1 wherein the pretensioner further comprises a pretensioner body and an inner cylindrical tube, wherein the inner cylindrical tube is slideably attached to the inside of the pretensioner body, wherein the guide loop is attached to the inner cylindrical tube, and wherein when the pretensioner is deployed, the inner cylindrical tube moves the guide loop from the first lower position to the second fully upward position.

14. The product of claim 1 wherein the shoulder belt guide loop is at least one of a rotating style or a non-rotating style and is attached to a piston through a slot in a pretensioner housing.

15. A method comprising: tightening a worn seatbelt during an impact event comprising: deploying a pretensioner during the impact event causing a shoulder belt guide loop to move from a first lower position to a second fully upward position; and tightening the worn seatbelt assembly when the shoulder belt guide loop moves from the first lower position to the second fully upward position.

16. A method for protecting an occupant during an impact event comprising: providing an adjustable shoulder belt guide loop with a pretension; and deploying the pretensioner during an impact event causing the adjustable shoulder belt guide loop to move from a first lower position to a second fully upward position so that a shoulder belt is configured to lay across a clavicle of the occupant during the impact event.

17. A safety restraint comprising:
   an adjustable shoulder belt guide loop, wherein the adjustable shoulder belt guide loop is constructed and arranged to be adjusted vertically between a fully upward position and a lower position on a vehicle pillar; and a pretensioner attached to the adjustable shoulder belt guide loop, wherein the pretensioner is constructed and arranged to move the adjustable shoulder belt guide loop vertically upward from the lower position to the fully upward position during an impact event.

* * * * *